(12) United States Patent
Pierce et al.

(10) Patent No.: US 8,381,423 B2
(45) Date of Patent: *Feb. 26, 2013

(54) SHOWCASE DISPLAY BADGE

(75) Inventors: Joel Thomas Pierce, Whitmore Lake, MI (US); Michael A. Musleh, Canton, MI (US); Bob Bretz, Howell, MI (US); John Turcotte, Walled Lake, MI (US); Andrew Murray, Colchester (GB); Paul Kenneth Dellock, Northville, MI (US); Will Farrelly, Chelmsford (GB)

(73) Assignees: Ford Global Technologies, LLC, Dearborn, MI (US); Tribar Manufacturing, LLC, Howell, MI (US); Granby Mold, Inc., Walled Lake, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/403,449

(22) Filed: Feb. 23, 2012

(65) Prior Publication Data
US 2012/0144705 A1    Jun. 14, 2012

Related U.S. Application Data

(62) Division of application No. 12/553,665, filed on Sep. 3, 2009, now Pat. No. 8,266,833.

(51) Int. Cl.
G09F 13/18    (2006.01)
(52) U.S. Cl. ............................................. 40/584
(58) Field of Classification Search .................. 40/546, 40/556, 564; 359/802, 803, 809, 619, 621, 359/462
See application file for complete search history.

(56) References Cited

U.S. PATENT DOCUMENTS

| | | | |
|---|---|---|---|
| 2,157,772 | A | 5/1939 | McCann et al. |
| 3,312,197 | A | 4/1967 | Smith |
| 4,178,535 | A | 12/1979 | Miller |
| 4,333,253 | A | 6/1982 | Cooper |
| 4,443,832 | A | 4/1984 | Kanamori et al. |
| 4,481,160 | A | 11/1984 | Bree |
| 4,605,575 | A | 8/1986 | Auld et al. |
| 4,965,950 | A | 10/1990 | Yamada |
| 4,977,695 | A | 12/1990 | Armbruster |
| 5,009,020 | A | 4/1991 | Watanabe |
| 5,223,357 | A | 6/1993 | Lovison |
| 5,249,104 | A | 9/1993 | Mizobe |
| 5,367,806 | A | 11/1994 | Hoffman |
| 5,698,276 | A | 12/1997 | Mirabitur |
| 6,174,075 | B1 | 1/2001 | Fuwausa |
| 6,190,026 | B1 | 2/2001 | Moore |
| 6,264,869 | B1 | 7/2001 | Notarpietro et al. |
| 6,308,444 | B1 | 10/2001 | Ki |
| 6,523,978 | B1 | 2/2003 | Huang |
| 6,548,128 | B2 | 4/2003 | Auld et al. |
| 6,701,652 | B1 | 3/2004 | McElhatton et al. |
| 6,729,055 | B2 | 5/2004 | Chou |
| 6,735,893 | B2 | 5/2004 | Wolf |
| 6,971,758 | B2 | 12/2005 | Inui et al. |
| 7,175,324 | B2 | 2/2007 | Kwon |
| 7,192,148 | B2 | 3/2007 | Tsai et al. |
| 7,387,397 | B2 | 6/2008 | Konet et al. |
| 7,752,791 | B2 | 7/2010 | Misawa et al. |

(Continued)

Primary Examiner — Casandra Davis
(74) Attorney, Agent, or Firm — Raymond Coppiellie; Price Heneveld LLP

(57) ABSTRACT

A vehicle showcase display badge is provided which includes a bezel, a substantially transparent front lens, and a rear lens comprising a light transparent front surface and a colored reflective rear surface. The badge also includes a graphic assembly disposed between the front lens and the rear lens, wherein the rear lens provides a three-dimensional appearance of the graphic assembly. The badge further includes an attachment for attaching the badge to a vehicle such that the graphic assembly is viewable. One or more curved surfaces may be employed on the rear lens to provide a shadow effect. One or more of the lenses may be overmolded.

21 Claims, 6 Drawing Sheets

U.S. PATENT DOCUMENTS

| | | |
|---|---|---|
| 7,942,542 B1 | 5/2011 | Dunn |
| 8,011,818 B2 | 9/2011 | Negley |
| 2004/0045199 A1 | 3/2004 | Ki |
| 2004/0095741 A1 | 5/2004 | Chen |
| 2005/0223537 A1 | 10/2005 | Hamilton et al. |
| 2007/0104897 A1 | 5/2007 | Oba et al. |
| 2008/0090031 A1 | 4/2008 | Hirzmann |
| 2008/0253140 A1 | 10/2008 | Fleischmann et al. |
| 2009/0000170 A1 | 1/2009 | Capuzzi |

SHOWCASE DISPLAY BADGE

CROSS-REFERENCE TO RELATED APPLICATION

This application is a divisional of U.S. patent application Ser. No. 12/553,665, filed on Sep. 3, 2009, now U.S. Pat. No. 8,266,833, entitled "SHOWCASE DISPLAY BADGE." The aforementioned related application is hereby incorporated by reference.

FIELD OF THE INVENTION

The present invention generally relates to a display badge or emblem, and more particularly relates to a showcase badge for use on a vehicle.

BACKGROUND OF THE INVENTION

Showcase display badges or emblems are commonly employed on vehicles to prominently display a vehicle manufacturer's logo, name or other graphic display. Showcase badges typically include a housing or bezel and a graphic assembly disposed within the bezel. The graphic assembly typically has a printed name or logo arranged in the bezel for prominent display. Additionally, a plastic protective transparent cover may be provided over the front of the graphic assembly. For some vehicles, it may be desirable to have a more prominent upscale showcase badge to enhance the attractiveness of the vehicle and the graphic display.

SUMMARY OF THE INVENTION

According to one aspect of the present invention, a vehicle showcase display badge is provided. The display badge comprises a bezel, a substantially transparent front lens, and a rear lens comprising a rear surface. A reflective medium is located at the rear surface of the rear lens. The display badge also includes a graphic assembly disposed between the front lens and the rear lens. The rear lens provides a three-dimensional appearance of the graphic assembly. The display badge further includes an attachment for attaching the badge to a vehicle, such that the graphic assembly is viewable.

According to another aspect of the present invention, a showcase display badge is provided. The display badge includes a bezel, a substantially transparent front lens, and a rear lens comprising a light transparent front surface and a rear surface. A reflective medium is located at the rear surface of the rear lens. The display badge also includes a graphic assembly disposed between the front lens and the rear lens. The rear lens provides a three-dimensional appearance of the graphic assembly.

These and other aspects, objects, and features of the present invention will be understood and appreciated by those skilled in the art upon studying the following specification, claims, and appended drawings.

DETAILED DESCRIPTION OF PREFERRED EMBODIMENTS

Figure 2:
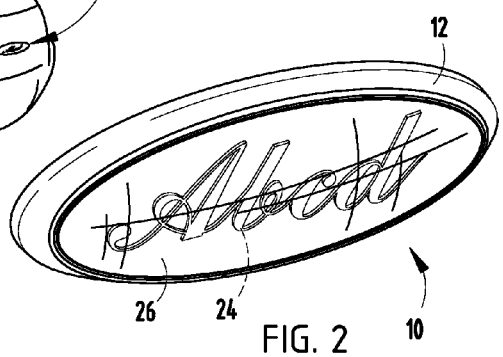
FIG. 2 is an enlarged front perspective view of the showcase display badge shown in FIG. 1.

For purposes of description herein, the terms "upper," "lower," "right," "left," "rear," "front," "vertical," "horizontal," and derivatives thereof shall relate to the invention as oriented in FIG. 2. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 1:
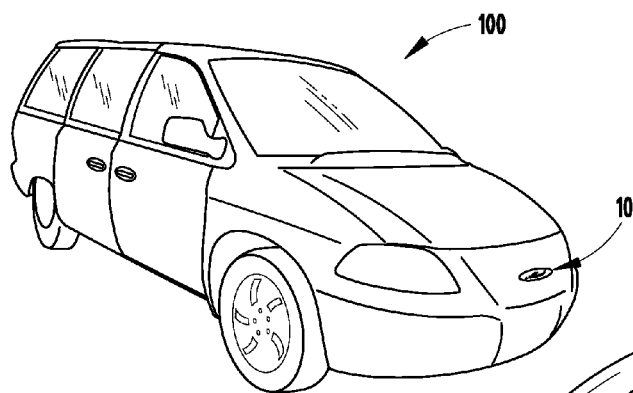
FIG. 1 is front perspective view of a vehicle equipped with a showcase display badge, according to a first embodiment.

Referring now to FIG. 1, an automotive wheeled vehicle 100 is generally illustrated having one or more showcase display badges or emblems 10 prominently attached thereto, according to one embodiment. The vehicle 10 may include a car, a truck, a van or other vehicle that employs one or more prominently display badges to display a printed name, logo or other indicia. The showcase display badge 10 is shown displaying a stylized name logo 24, shown as abcd, according to one example. It should be appreciated that the graphic display 24 presented by the showcase display badge 10 may include any name, abbreviation, logo, stylistic display or other indicia for prominent display.

Figure 3:
FIG. 3 is a top view of the display badge shown in FIG. 2.
Figure 4:
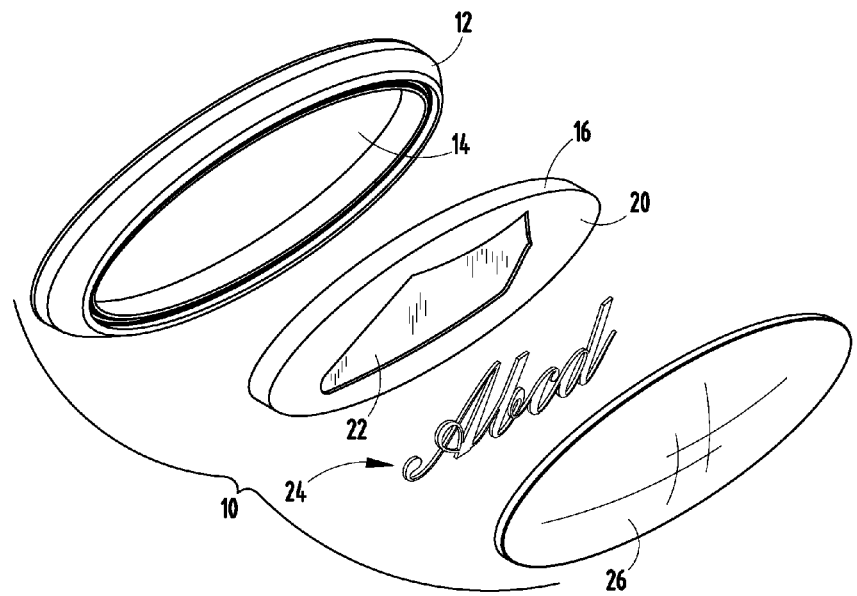
FIG. 4 is a front perspective exploded view of the display badge shown in FIG. 2.
Figure 5:
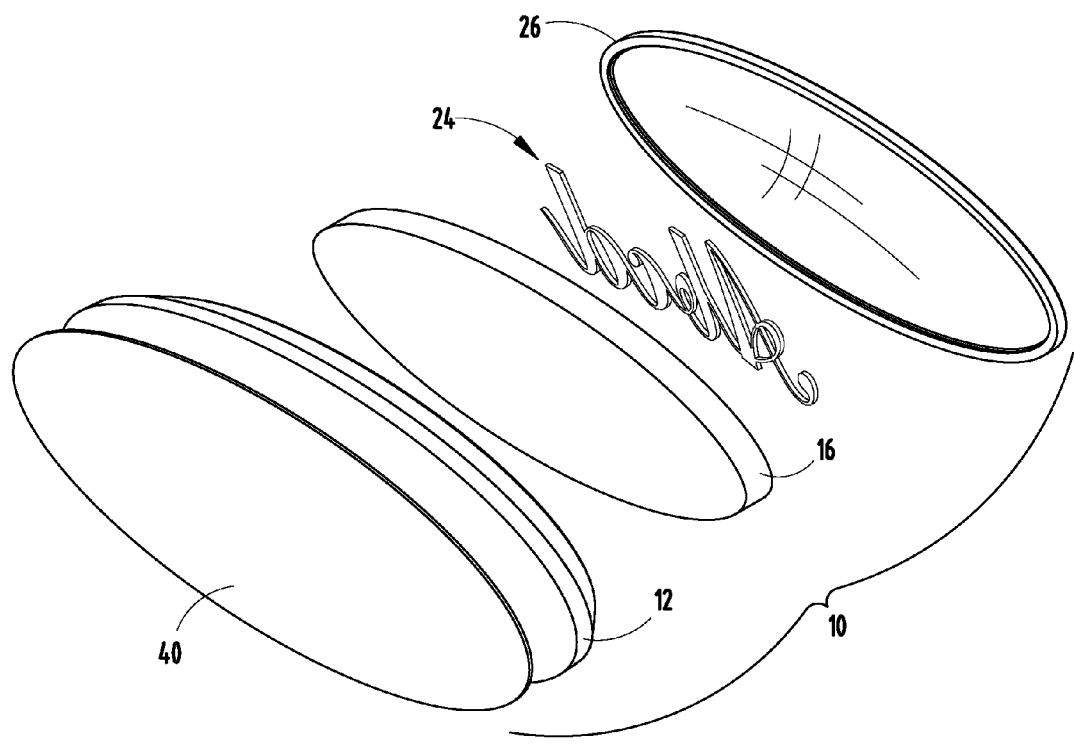
FIG. 5 is a rear perspective exploded view of the display badge shown in FIG. 2.
Figure 6:
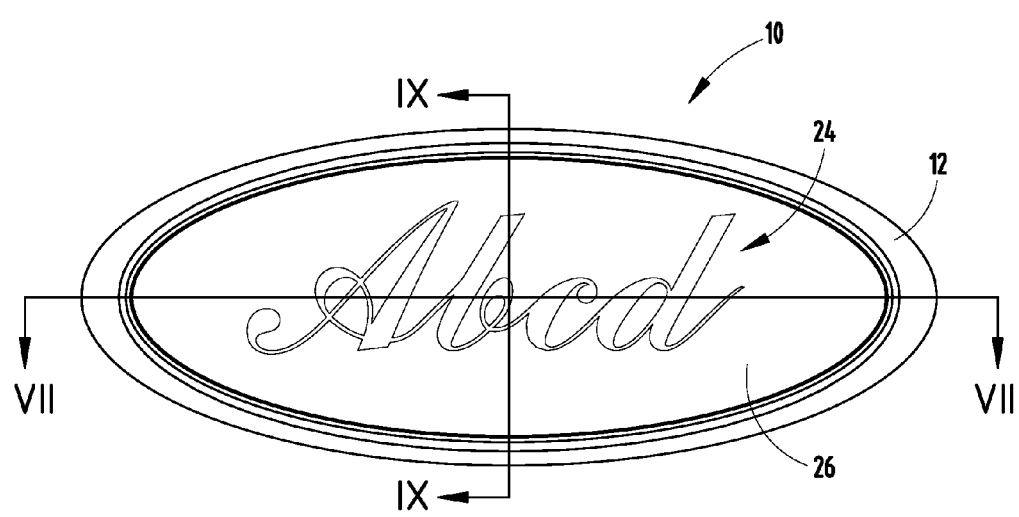
FIG. 6 is a front view of the display badge shown in FIG. 2.
Figure 7:
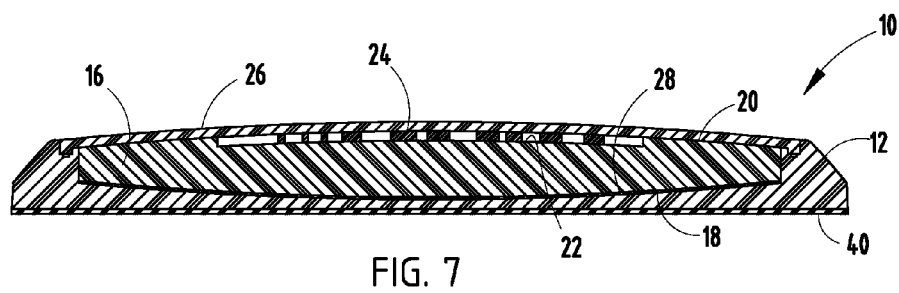
FIG. 7 is a cross-sectional view of the display badge taken through line VII-VII of FIG. 6.
Figure 8:
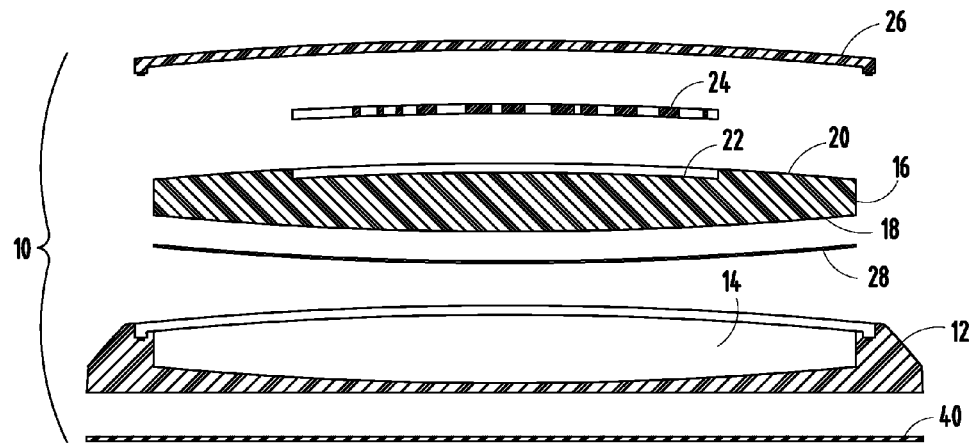
FIG. 8 is an exploded cross-sectional view taken through line VII-VII of FIG. 6.
Figure 9:
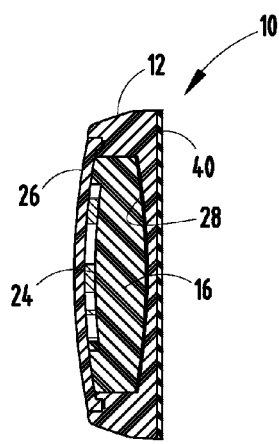
FIG. 9 is a cross-sectional view of the display badge taken through line IX-IX of FIG. 6.
Figure 10:
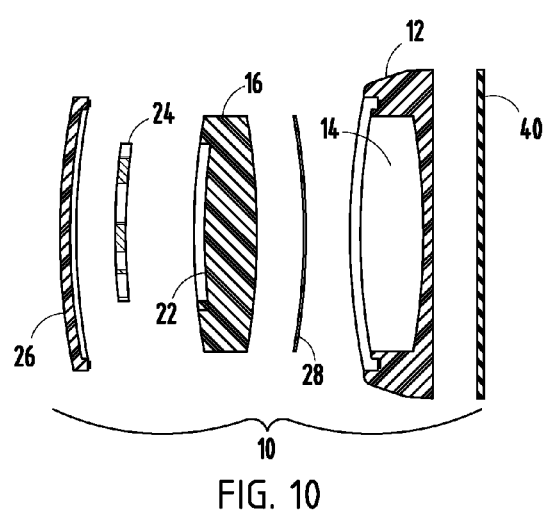
FIG. 10 is an exploded cross-sectional view of the display badge taken through line IX-IX of FIG. 6.

The showcase display badge 10 is shown according to a first embodiment in FIGS. 1-10. The display badge 10 has a generally oval shape, according to one embodiment, with an outer housing or bezel 12, generally defining the overall oval shape. It should be appreciated that the bezel 12 may be configured in other shapes and sizes to define the outer perimeter housing of the showcase display badge 10. As seen in FIG. 3, the bezel 12 has an outer peripheral edge that angles or curves inward from the rear side toward the front side of the badge 10. The bezel 10 may be made of an ornamental material, such as chromed plastic (plastic coated with chrome), or may otherwise be coated or painted. Referring to FIGS. 4 and 5, the bezel 12 is shown having a central recess 14. The recess 14 provides an open region into which the various components are assembled and has a rear or back wall. Assembled inside of the bezel 12 generally within the recess 14 is a rear lens 16, a graphic assembly 24, and a front lens 26.

The rear lens 16 has a generally oval shape outer periphery, according to one embodiment. The rear lens 16 may include a plastic lens having a light transparent front surface that is light transparent when viewed from the front surface and also has a rear surface. The rear surface has a colored reflective medium formed on or attached thereto. The rear lens 16 may be made of an injection molded transparent (clear) acrylic. The colored reflective rear surface may include a colored paint or a separate member that provides a color and has a reflective surface facing forward to at least partially reflect light towards the front lens 26 from the rear side of rear lens 16. The rear lens 16 has a sufficient thickness to provide a shadow appearance effect. According to one embodiment, the rear lens 16 has a thickness in the range of three to nine millimeters (3-9 mm).

The front side of the rear lens 16 is shown having a recess or depression 22 of a shape and size adapted to receive the graphic assembly 24, according to one embodiment. The depression 22 may be shaped to conform to the shape of the graphic assembly 24. The graphic assembly 24 may include colored plastic (polymeric) ornamental letters and characters that generally provide a display assembly, according to one embodiment. According to other embodiments, the graphic assembly 24 may include a printed ink or other visual display. The graphic assembly 24 may be installed into the depression 22 in rear lens 16 and retained in place by assembly of the front lens 26 abutting up against the rear lens 16 to sandwich the graphic assembly 24 therebetween, according to one embodiment. According to other embodiments, the graphic assembly 24 and the front side of the rear lens 16 may have connectors, such as a pin and slot connection assembly, or the graphic assembly 24 may be otherwise adhered to the front surface of the rear lens 16.

According to one embodiment, the rear surface of the bezel 12 has an adhesive material 40 provided thereon for adhering the badge 10 onto a structure, such as a vehicle 100. The adhesive material 40 may include a single layer of adhesive or a medium having adhesive on one or both sides. It should be appreciated that the bezel 12 may otherwise be adhered or attached to the vehicle 100 by way of mechanical connectors or fasteners, according to other embodiments.

Referring to FIGS. 7-10, the rear lens 16 is shown having both a curved front surface 20 and a curved rear surface 18. The rear surface of bezel 12 has an inner concave surface with a curve of a size and shape adapted to receive the curved rear surface 18 of rear lens 16. The rear curved surface 18 of rear lens 16 is generally curved outward or is convex with a crown surface having a variation in depth of about two millimeters (2 mm) over a length of about one hundred six millimeters (106 mm), according to one embodiment. The front surface 20 of rear lens 16 likewise is generally curved outward or is convex with a crown surface having a variation in depth of about two millimeters (2 mm) over a length of about one hundred six millimeters (106 mm), according to this embodiment. The curvature on the front and rear surfaces 18 and 20 of the rear lens 16 provides an optical magnification and generates a shadow effect of the graphic assembly 24.

The colored reflective surface 28 is shown provided at (e.g., on) the rear surface 18 of rear lens 16. It should be appreciated that the colored reflective surface 28 may include a paint or ink, such as chrome ink, having a reflective or partially reflective surface facing forward. The rear lens 16 is transparent and light transmissive except for the rear surface 18 such that light passes into the rear lens 16 from the front surface 20 and is at least partially reflected forward off of the colored reflective surface 28 at the rear surface 18 of rear lens 16. As a result, the graphic assembly 24 is viewable from the front side such that the graphic assembly 24 is seen and the reflectance off of the colored reflective surface 18 through the rear lens 16 is also seen as it is optically magnified to create a three-dimensional effect of the graphic assembly 24 and a shadow effect.

The front lens 26 has a generally oval shape with a crown provided on the front surface thereof. The front lens 26 is also shown having a crown surface having a variation in depth of about five millimeters (5 mm) over a length of about one hundred twelve millimeters (112 mm) on both the front and rear surfaces, according to one embodiment. The crown formed on the front lens 26 provides a showcase effect. The front lens 26 may be assembled at the perimeter of the bezel 12 such as by adhesive or other connectors. The front lens 26 may include a plastic lens that is transparent and light transmissive and has a rear surface with a shape that conforms generally to the front surface 20 of rear lens 16 and covers the front of the graphic assembly 24. The front lens 26 may be made of a transparent (clear) molded acrylic, according to one embodiment. As a result, the front lens 26 and rear lens 16 generally sandwich the graphic assembly 24 in place within depression 22.

Figure 11:
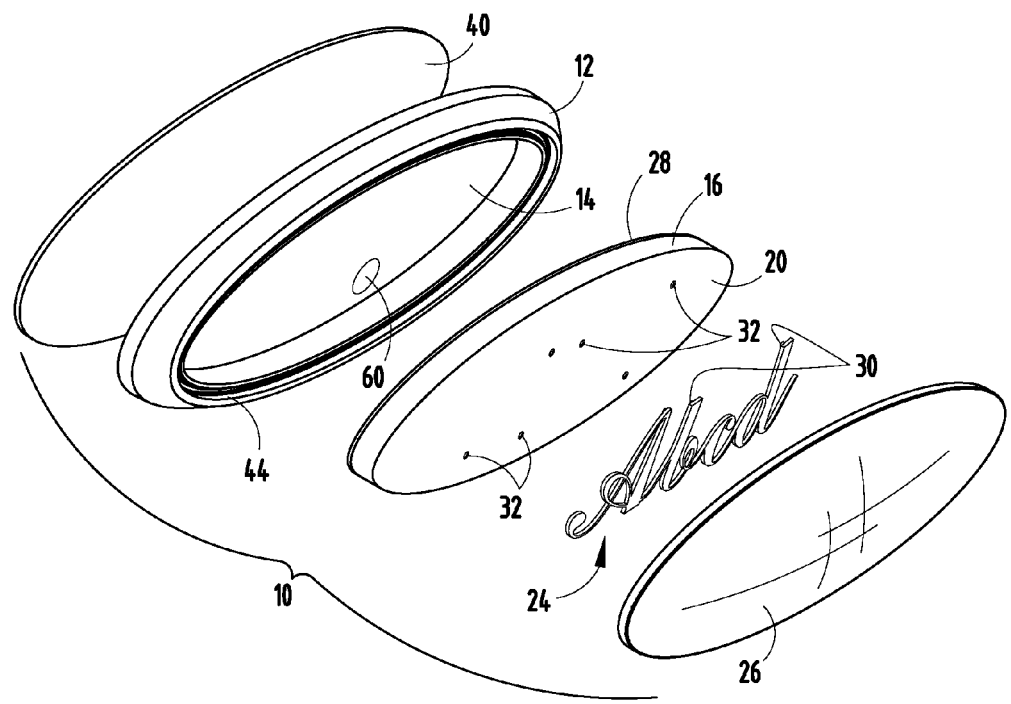
FIG. 11 is a front perspective exploded view of a showcase display badge, according to a second embodiment.
Figure 12:
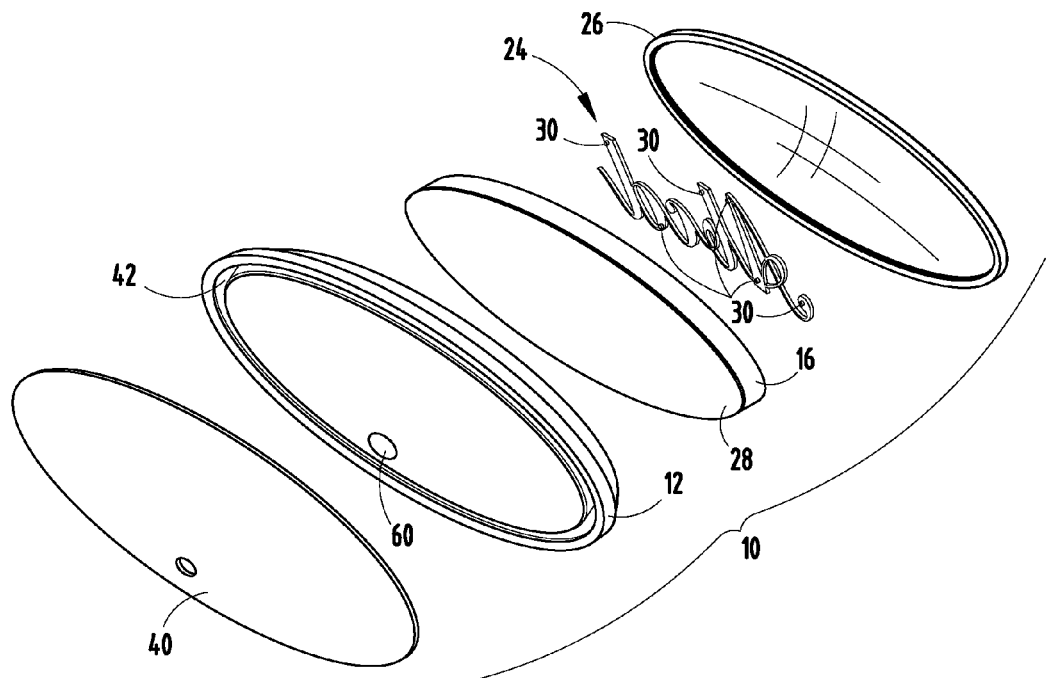
FIG. 12 is a rear perspective exploded view of the display badge shown in FIG. 11.
Figure 13:
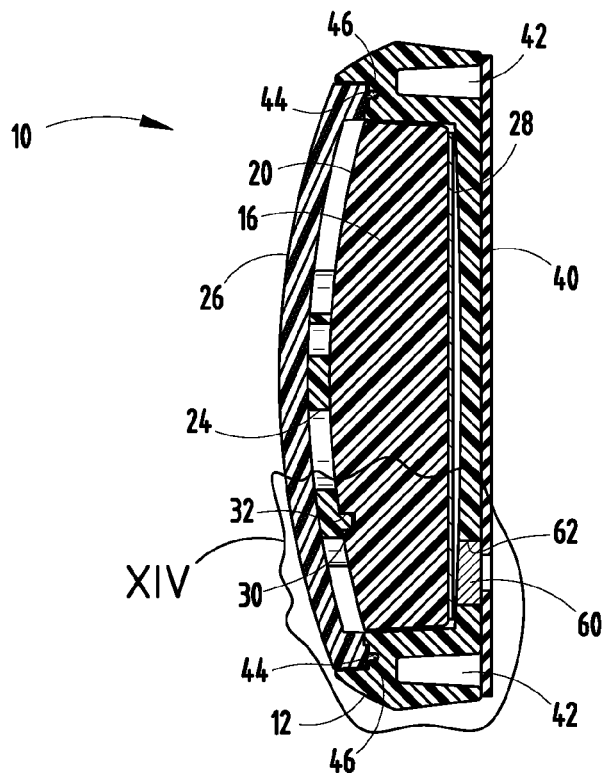
FIG. 13 is a cross-sectional view of the display badge shown in FIG. 11.

Referring to FIGS. 11 and 12, a showcase display badge 10 is shown according to a second embodiment. In this embodiment, the badge 10 includes a bezel 12, a rear lens 16, a front lens 26 and a graphic display 24 matingly connected to the front surface of the rear lens 16. The graphic display 24 is shown made up of two distinct components, according to one embodiment. However, it should be appreciated that the graphic display 24 may be made of one or more components. The individual components of the graphic display 24 include one or more connecting members on the rear side shown in the form of outward extending pins 30 that matingly connect to slots or openings 32 provided in the front surface of the rear lens 16. The pins 30 may have a length of approximately one mil, according to one example, and provide an alignment and mating connection, while minimizing undesirable visual effects. Essentially, the pins 30 engage the respective openings 32 to align and hold the graphic assembly 24 in place and the graphic assembly 24 is further sandwiched between the front lens 26 and rear lens 16.

In this embodiment, the front lens 26 has an outward curved or convex front surface and an outward curved or convex rear surface. The rear lens 16 has a somewhat flat rear surface and an outward curved or convex front surface. Printed or otherwise attached to the front surface of the rear wall of the bezel 12 and abutting the rear surface of the rear lens 16 is the colored reflective surface 28. It should be appreciated that the colored reflect surface 28 may otherwise be applied directly to the rear surface of the rear lens 16.

Figure 14:
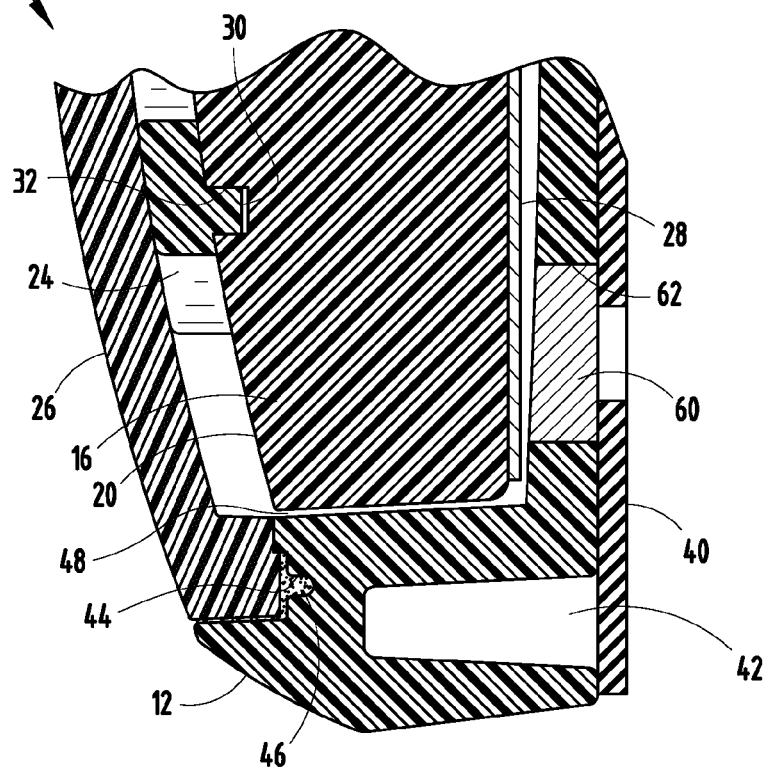
FIG. 14 is a partially enlarged cross-sectional view of the display badge shown in FIG. 11.

As seen in more detail in FIG. 14, the front lens 26 may be adhered to the bezel 12 by way of an adhesive 46 so as to hold the assembly together. The bezel 12 is shown having an overflow groove 44 for receiving the adhesive 46. Additionally, the bezel 12 is shown having a core-out portion 42 formed in the rear side near the perimeter in a generally U-shape section for providing a somewhat uniform thickness of the molded plastic bezel.

In this embodiment, the space in between and to the sides of the characters of the graphic assembly 24 between the rear lens 16 and the front lens 26 is open void volume 48 which may contain a fluid, such as air or gas. The void volume 48 is also shown extending between the inside side walls of the bezel 12 and the rear lens 16. A valve or moisture outlet 60 may further be provided as shown in the rear wall of bezel 12 to prevent the accumulation of moisture within the void volume 48 so as to prevent moisture or fog accumulation inside the display badge 12. The valve 60 may include a one-way valve for allowing moisture to exit the badge 10. According to another embodiment, a gas permeable barrier may be used that includes an air permeable material that allows air to permeate but prevents moisture from permeating therethrough, such as Gore-Tex®. It should be appreciated that the air permeable material or valve 16 may likewise be used in other embodiments of the display badge 10. According to another embodiment, the void volume 48 may be filled with a transparent and light transmissive material, such as a transparent acrylic.

Figure 15:
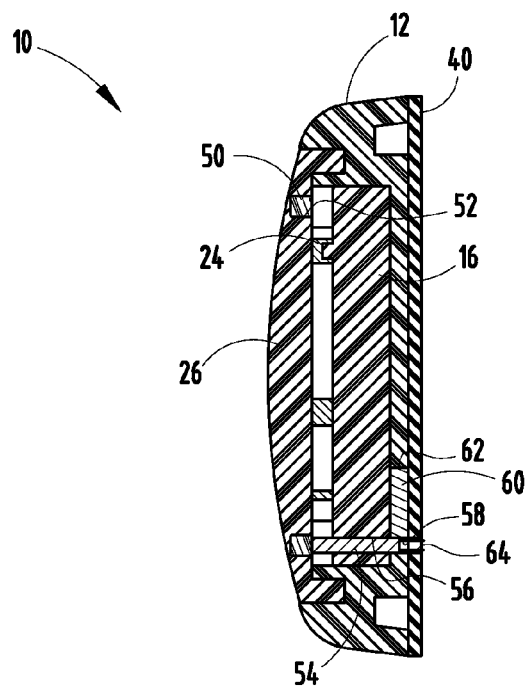
FIG. 15 is a cross-sectional view of a display badge, according to a third embodiment.
Figure 16:
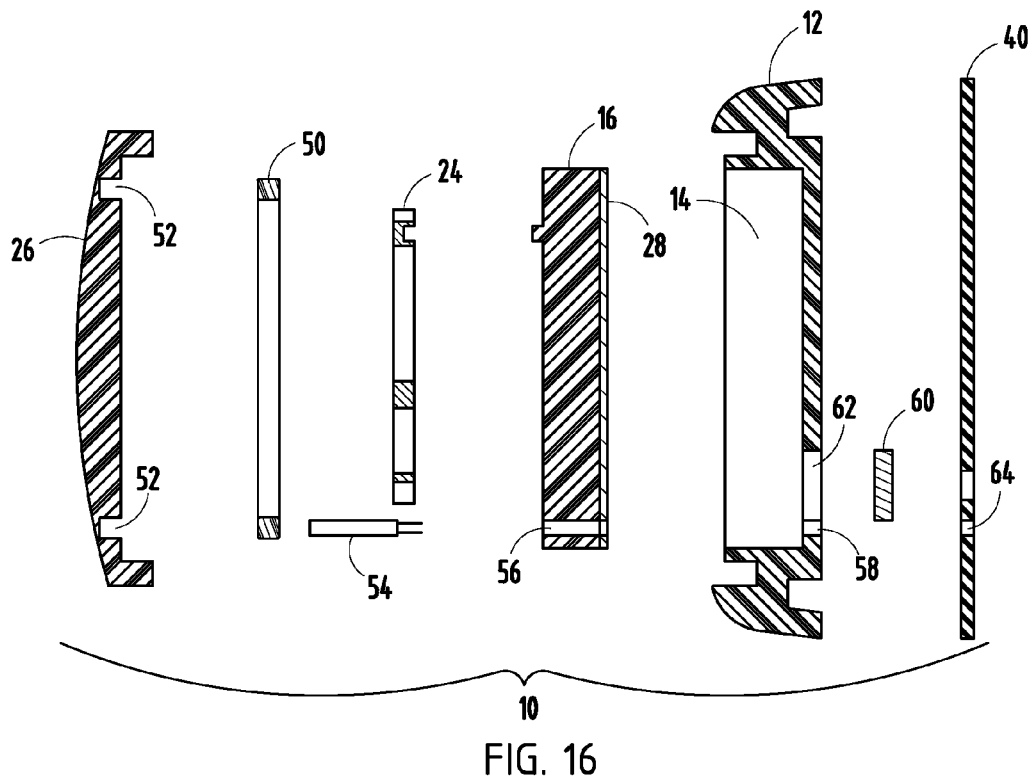
FIG. 16 is an exploded cross-sectional view of the display badge shown in FIG. 15.

Referring to FIGS. 15 and 16, a showcase display badge 10 is illustrated according to a third embodiment. In this embodiment, the front lens 26 has a generally convex outward protruding front surface and a generally planar rear surface with ring-shaped channel 52 formed therein. The rear lens 16 has a front planar surface and a rear planar surface. The graphic assembly 24 is disposed between the front lens 26 and rear lens 16 and a void volume may exist in the region where the graphic assembly 24 is disposed between the front lens 26 and rear lens 16, such as between the graphic characters of the graphic assembly 24.

In this embodiment, a lighted ring 50 is disposed within the oval shaped ring channel 52 in the rear surface of the front lens 26. The light ring 50 may include any lighted device, such as one or more light emitting diodes (LEDs) which may be electrically powered by way of an electrical connector 24 to illuminate the display of the graphic assembly of the display badge 10. The electrical connector 54 is shown extending through an opening 56 in the rear lens 16 and further through an opening 58 in the rear wall of the bezel 12 and an opening in adhesive 64 such that it may be coupled to an electrical power supply to power the light ring 50.

In this embodiment, an open void volume may exist between the front lens 26 and rear lens 16, generally in the region of the graphic assembly 24 as described in connection with the embodiment shown in FIG. 11. To reduce or prevent moisture buildup within the showcase display badge 10, a moisture control medium in the form of a valve or gas permeable barrier 60 may be installed in fluid communication with the void volume. In the embodiment shown, the gas permeable barrier or valve 60 is shown installed in the rear wall of the bezel 12 within opening 62. According to one embodiment, the valve 60 may include a one-way valve for allowing moisture to exit the badge 10. According to another embodiment, the gas permeable barrier may include an air permeable material that allows air to permeate but prevents moisture from permeating therethrough, such as Gore-Tex®. It should be appreciated that the air permeable material or valve 60 may likewise be used in other embodiments of the display badge 10.

Accordingly, the showcase display badge 10 advantageously provides for the prominent display of a name, logo or other indicia which may be particularly useful on a vehicle 100. The showcase display badge 10 provides a three-dimensional image of the graphic assembly by providing an optical magnification through the use of front and rear lenses and a rear reflective surface, shown as a colored reflective surface. Further, by providing curvature to one or more surfaces of the rear lens, the graphic assembly can be viewed with a shadow effect to enhance the three-dimensional image.

It is to be understood that variations and modifications can be made on the aforementioned structure without departing from the concepts of the present invention, and further it is to be understood that such concepts are intended to be covered by the following claims unless these claims by their language expressly state otherwise.

We claim:

1. A vehicle showcase display badge comprising:
   a bezel;
   a substantially transparent front lens;
   a rear lens comprising a curved surface;
   a reflective medium located at a rear surface of the rear lens;
   a graphic assembly disposed between the front lens and the rear lens, wherein the rear lens provides a three-dimensional appearance of the graphic assembly; and
   an attachment for attaching the badge to a vehicle such that the graphic assembly is viewable.

2. The badge as defined in claim 1, wherein the reflective medium comprises a colored reflective surface.

3. The badge as defined in claim 1, wherein the rear lens comprises a curved rear surface.

4. The badge as defined in claim 1, wherein the rear lens comprises a concave rear surface so as to provide a shadow effect.

5. The badge as defined in claim 1, wherein the front lens comprises a molded plastic lens.

6. The badge as defined in claim 1 further comprising a gas permeable barrier for allowing the release of moisture.

7. The badge as defined in claim 1, wherein the attachment comprises adhesive tape.

8. The badge as defined in claim 7, wherein the attachment comprises a mechanical fastener.

9. The badge as defined in claim 1 further comprising a light provided in the badge for illuminating the graphic assembly.

10. The badge as defined in claim 9, wherein the light comprises a light ring.

11. A showcase display badge comprising:
    a bezel;
    a substantially transparent front lens;
    a rear lens comprising a light transparent front surface and a rear surface, wherein the rear lens comprises a curved surface;
    a reflective medium located at a rear surface of the rear lens; and
    a graphic assembly disposed between the front lens and the rear lens, wherein the rear lens provides a three-dimensional appearance of the graphic assembly.

12. The badge as defined in claim 11, wherein the reflective medium comprises a colored reflective rear surface.

13. The badge as defined in claim 11, wherein the rear surface comprises the curved surface.

14. The badge as defined in claim 11, wherein the rear surface comprises a convex rear surface.

15. The badge as defined in claim 11, wherein the front lens comprises a molded plastic lens.

16. The badge as defined in claim 11 further comprising a gas permeable barrier for allowing the release and moisture.

17. The badge as defined in claim 11, wherein the badge further comprises an attachment for attaching to a structure.

18. The badge as defined in claim 17, wherein the attachment comprises an adhesive material for adhering to a vehicle.

19. The badge as defined in claim 11 further comprising a light provided on the badge for illuminating the graphic assembly.

20. The badge as defined in claim 19, wherein the light comprises a light ring.

21. A showcase display badge comprising:
a bezel;
a substantially transparent front lens;
a rear lens comprising a front surface and a curved rear surface;
a reflective medium located at the rear surface of the rear lens; and
a graphic assembly disposed between the front lens and the rear lens.

* * * * *